(12) United States Patent
Hwang et al.

(10) Patent No.: US 12,446,003 B2
(45) Date of Patent: Oct. 14, 2025

(54) METHOD AND DEVICE FOR CONFIGURING LOCATION OF SWITCHING TIME

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 498 days.

(21) Appl. No.: 17/632,373

(22) PCT Filed: Jul. 29, 2020

(86) PCT No.: PCT/KR2020/009989
§ 371 (c)(1),
(2) Date: Feb. 2, 2022

(87) PCT Pub. No.: WO2021/029577
PCT Pub. Date: Feb. 18, 2021

(65) Prior Publication Data
US 2022/0295451 A1 Sep. 15, 2022

(30) Foreign Application Priority Data
Aug. 9, 2019 (KR) .................. 10-2019-0097562

(51) Int. Cl.
*H04W 72/02* (2009.01)
*H04W 36/00* (2009.01)
(Continued)

(52) U.S. Cl.
CPC .......... *H04W 72/02* (2013.01); *H04W 36/037* (2023.05); *H04W 72/044* (2013.01);
(Continued)

(58) Field of Classification Search
CPC ... H04W 72/00; H04W 72/02; H04W 72/044; H04W 72/0446; H04W 72/04;
(Continued)

(56) References Cited

U.S. PATENT DOCUMENTS

2019/0104543 A1 4/2019 Park
2019/0149305 A1* 5/2019 Zhou .................. H04L 5/0092
370/330
(Continued)

FOREIGN PATENT DOCUMENTS

WO WO-2019160788 A1 * 8/2019 ............ H04W 72/10
WO WO-2020142932 A1 * 7/2020

OTHER PUBLICATIONS

5G, NR, Physical layer procedures for control, 3GPP TS 38.213 version 15.6.0 Release 15, ETSI TS 138 213 V15.6.0, Jul. 2019, Jun. 24, 2019, see section 12.
(Continued)

*Primary Examiner* — Warner Wong
(74) *Attorney, Agent, or Firm* — BRYAN CAVE LEIGHTON PAISNER LLP

(57) ABSTRACT

A disclosure of the present specification provides a method for switching a bandwidth part (BWP) for sidelink communication. The method may comprise the steps of: receiving information on BWP switching timing from a base station; and performing BWP switching on the basis of the information on BWP switching timing. The information on BWP switching timing may include first BWP switching information or second BWP switching information. The first BWP switching information may be time information about BWP switching from a sidelink (SL) to an uplink (UL) or a downlink (DL) with the base station. The second BWP switching information may be time information about BWP
(Continued)

switching to the sidelink (SL) from the uplink (UL) or the downlink (DL) with the base station.

12 Claims, 20 Drawing Sheets

(51) Int. Cl.
*H04W 72/044* (2023.01)
*H04W 72/20* (2023.01)
*H04L 1/1867* (2023.01)
*H04L 5/00* (2006.01)
*H04W 72/40* (2023.01)
*H04W 92/18* (2009.01)

(52) U.S. Cl.
CPC ........... *H04W 72/20* (2023.01); *H04L 1/1893* (2013.01); *H04L 5/00* (2013.01); *H04W 72/40* (2023.01); *H04W 92/18* (2013.01)

(58) Field of Classification Search
CPC . H04W 72/0406; H04W 92/00; H04W 92/16; H04W 92/18; H04W 72/15; H04W 72/20; H04W 72/21; H04W 72/23; H04W 72/40; H04W 72/50; H04W 72/563; H04W 76/00; H04W 16/10; H04W 28/00; H04W 28/0875; H04W 28/16; H04L 1/1893; H04L 5/00; H04L 41/0896; H04L 47/78; H04L 47/781; H04L 2012/5631
See application file for complete search history.

(56) References Cited

U.S. PATENT DOCUMENTS

| | | | |
|---|---|---|---|
| 2019/0357260 A1* | 11/2019 | Cirik | H04L 5/0092 |
| 2020/0235898 A1* | 7/2020 | Loehr | H04W 72/21 |
| 2020/0351067 A1* | 11/2020 | Hui | H04L 5/001 |
| 2021/0028912 A1* | 1/2021 | Xu | H04L 5/0098 |
| 2021/0160876 A1* | 5/2021 | Osawa | H04W 72/0453 |
| 2021/0168814 A1* | 6/2021 | Chen | H04W 72/02 |
| 2021/0243773 A1* | 8/2021 | Osawa | H04L 5/0053 |
| 2021/0258958 A1* | 8/2021 | Li | H04L 5/0037 |
| 2021/0400663 A1* | 12/2021 | Lee | H04W 4/40 |
| 2022/0217717 A1* | 7/2022 | Kaikkonen | H04W 56/0005 |
| 2022/0239452 A1* | 7/2022 | Kazmi | H04W 36/06 |

OTHER PUBLICATIONS

LG Electronics, Discussion on physical layer structure for NR sidelink, R1-1907012, 3GPP TSG RAN WG1 #97, Reno, USA, May 3, 2019, see section 2.1.7.

Samsung, BWP Aspects of SL and Uu Prioritisation, R2-1905723, 3GPP TSG RAN WG2 #106, Reno, USA, May 2, 2019, see section 2.

CMCC, Discussion on the impact of waking up signal on BWP switching operation, R1-1906525, 3GPP TSG RAN WG1 #97, Reno, USA, May 2, 2019, see section 2.

* cited by examiner

METHOD AND DEVICE FOR CONFIGURING LOCATION OF SWITCHING TIME

This application is the National Stage filing under 35 U.S.C. 371 of International Application No. PCT/KR2020/009989 filed on Jul. 29, 2020, which claims priority to Korean Patent Application No. 10-2019-0097562 filed on Aug. 9, 2019, the contents of which are all hereby incorporated by reference herein in their entirety.

The present specification relates to mobile communications.

BACKGROUND

With the success of long term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

For the 5G mobile communication, new radio access technology (new RAT or NR) has been researched.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

Meanwhile, LTE/LTE-A technology and NR technology may also be used for vehicle communication. This is called vehicle-to-everything (V2X). Communication technology through all interfaces with the vehicle is commonly called V2X.

Communication between V2X devices without going through a base station is called V2X communication, and a link used for communication between V2X devices is also called a sidelink.

In 5G NR, four bandwidth parts (BWPs) can be configured for uplink or downlink in the UE, and one BWP can be activated to perform communication.

Meanwhile, a sidelink for device to device (D2D) communication or vehicle to everything (V2X) communication may be configured to operate on a BWP different from a bandwidth part (BWP) for uplink. In this case, in order for the UE (ie, the wireless communication device) to use the sidelink, it must change from the first BWP for the uplink to the second BWP for the sidelink, resulting in a time delay. There is this.

SUMMARY

Therefore, the disclosure of the present specification is to propose method for solving the above-mentioned problems.

One disclosure of the present specification provides a method of BWP (bandwidth part) switching for sidelink communication. The method is comprising: receiving information about BWP switching timing from a base station; and performing BWP switching, based on the information about BWP switching timing, wherein the information about BWP switching timing includes first BWP switching information or second BWP switching information, wherein the first BWP switching information is time information on BWP switching from sidelink (SL) to the downlink (DL) or uplink (UL) with the base station, wherein the second BWP switching information is time information on BWP switching from downlink (DL) or uplink (UL) with the base station to sidelink (SL).

One disclosure of the present specification may provides a communication device switching BWP (bandwidth part) for sidelink communication. The communication device is comprising: at least one processor; and at least one memory for storing instructions and operably electrically connectable with the at least one processor, based on the instructions being operated by the at least one processor, performed operation comprising: receiving information about BWP switching timing from a base station; and performing BWP switching, based on the information about BWP switching timing, wherein the information about BWP switching timing includes first BWP switching information or second BWP switching information, wherein the first BWP switching information is time information on BWP switching from sidelink (SL) to the downlink (DL) or uplink (UL) with the base station, wherein the second BWP switching information is time information on BWP switching from downlink (DL) or uplink (UL) with the base station to sidelink (SL).

One disclosure of the present specification may provides a chipset equipped in a communication device. The chipset is comprising: at least one processor; at least one memory for storing instructions and operably electrically connectable with the at least one processor, based on the instructions being operated by the at least one processor, performed operation comprising: receiving information about BWP switching timing from a base station; and performing BWP switching, based on the information about BWP switching timing, wherein the information about BWP switching timing includes first BWP switching information or second BWP switching information, wherein the first BWP switching information is time information on BWP switching from sidelink (SL) to the downlink (DL) or uplink (UL) with the base station, wherein the second BWP switching information is time information on BWP switching from downlink (DL) or uplink (UL) with the base station to sidelink (SL).

One disclosure of the present specification may provides a non-volatile computer readable storage medium having recorded instructions, wherein the instructions, based on being executed by one or more processors, cause the one or more processors to: receive information about BWP switching timing from a base station; and perform BWP switching, based on the information about BWP switching timing, wherein the information about BWP switching timing includes first BWP switching information or second BWP switching information, wherein the first BWP switching information is time information on BWP switching from sidelink (SL) to the downlink (DL) or uplink (UL) with the base station, wherein the second BWP switching information is time information on BWP switching from downlink (DL) or uplink (UL) with the base station to sidelink (SL).

One disclosure of the present specification may provides a method of a base station, comprising: configuring information about BWP switching timing; and transmitting the information about BWP switching timing to user equipment (UE), wherein the information about BWP switching timing includes first BWP switching information or second BWP switching information, wherein the first BWP switching information is time information on BWP switching from sidelink (SL) to the downlink (DL) or uplink (UL) with the base station, wherein the second BWP switching information is time information on BWP switching from downlink (DL) or uplink (UL) with the base station to sidelink (SL).

One disclosure of the present specification may provides a base station, comprising: at least one processor; and at least one memory for storing instructions and operably electrically connectable with the at least one processor, based on the instructions being operated by the at least one processor, performed operation comprising: configuring information about BWP switching timing; and transmitting the information about BWP switching timing to user equipment (UE), wherein the information about BWP switching timing includes first BWP switching information or second BWP switching information, wherein the first BWP switching information is time information on BWP switching from sidelink (SL) to the downlink (DL) or uplink (UL) with the base station, wherein the second BWP switching information is time information on BWP switching from downlink (DL) or uplink (UL) with the base station to sidelink (SL).

Therefore, the disclosure of the present specification is to propose method for solving the above-mentioned problems.

DETAILED DESCRIPTION

Figure 1:
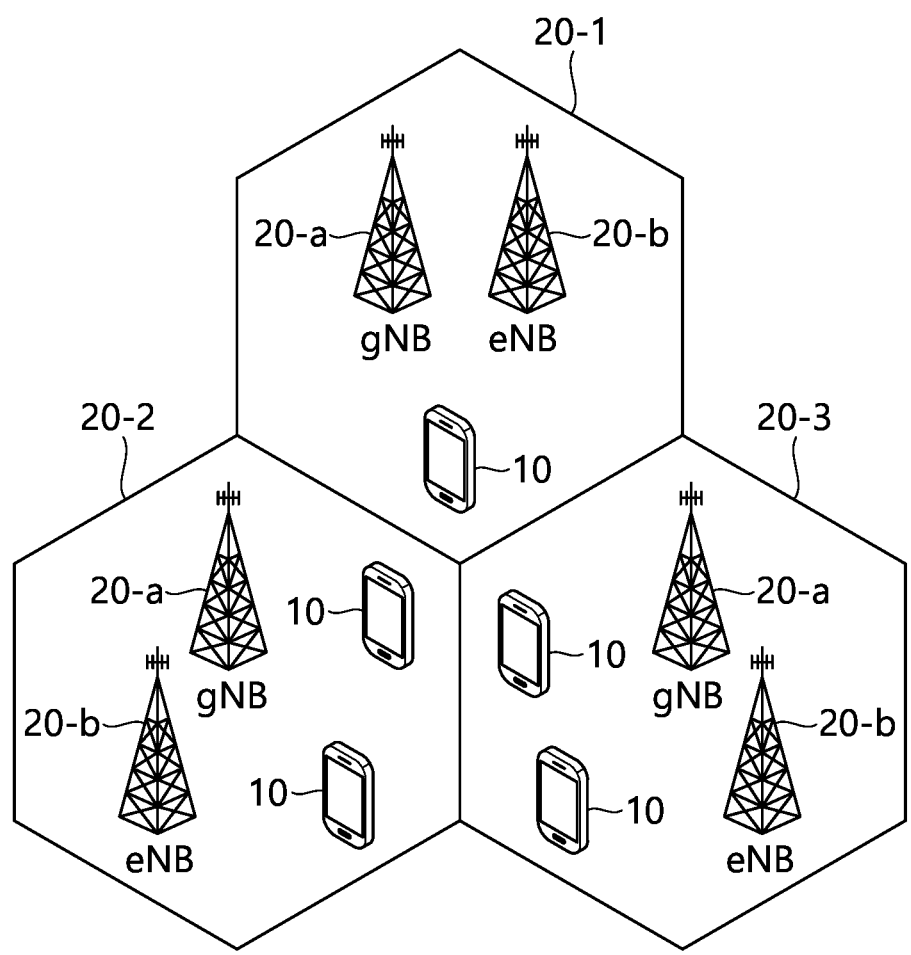
FIG. 1 is a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are individually described in one drawing in this specification may be implemented individually or simultaneously.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Hereinafter, the UE is used as an example of a device capable of wireless communication (eg, a wireless communication device, a wireless device, or a wireless device). The operation performed by the UE may be performed by any device capable of wireless communication. A device capable of wireless communication may also be referred to as a wireless communication device, a wireless device, or a wireless device.

A base station, a term used below, generally refers to a fixed station that communicates with a wireless device, which may be called other terms such as an evolved-NodeB (eNodeB), an evolved-NodeB (eNB), a BTS (Base Transceiver System), an access point (Access Point), gNB (Next generation NodeB).

FIG. 1 is a Wireless Communication System.

As can be seen with reference to FIG. 1, a wireless communication system includes at least one base station (BS). The BS is divided into a gNodeB (or gNB) 20*a* and an eNodeB (or eNB) 20*b*. The gNB 20*a* supports 5G mobile communication. The eNB 20*b* supports 4G mobile communication, that is, long term evolution (LTE).

Each base station 20*a* and 20*b* provides a communication service for a specific geographic area (commonly referred to as a cell) (20-1, 20-2, 20-3). A cell may in turn be divided into a plurality of regions (referred to as sectors).

A UE typically belongs to one cell, and the cell to which the UE belongs is called a serving cell. A base station providing a communication service to a serving cell is referred to as a serving base station (serving BS). Since the wireless communication system is a cellular system, other cells adjacent to the serving cell exist. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station (20) to the UE (10), and uplink means communication from the UE (10) to the base station (20). In the downlink, the transmitter may be a part of the base station (20), and the receiver may be a part of the UE (10). In the uplink, the transmitter may be a part of the UE (10), and the receiver may be a part of the base station (20).

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

Hereinafter, the LTE system will be described in more detail.

Figure 2:
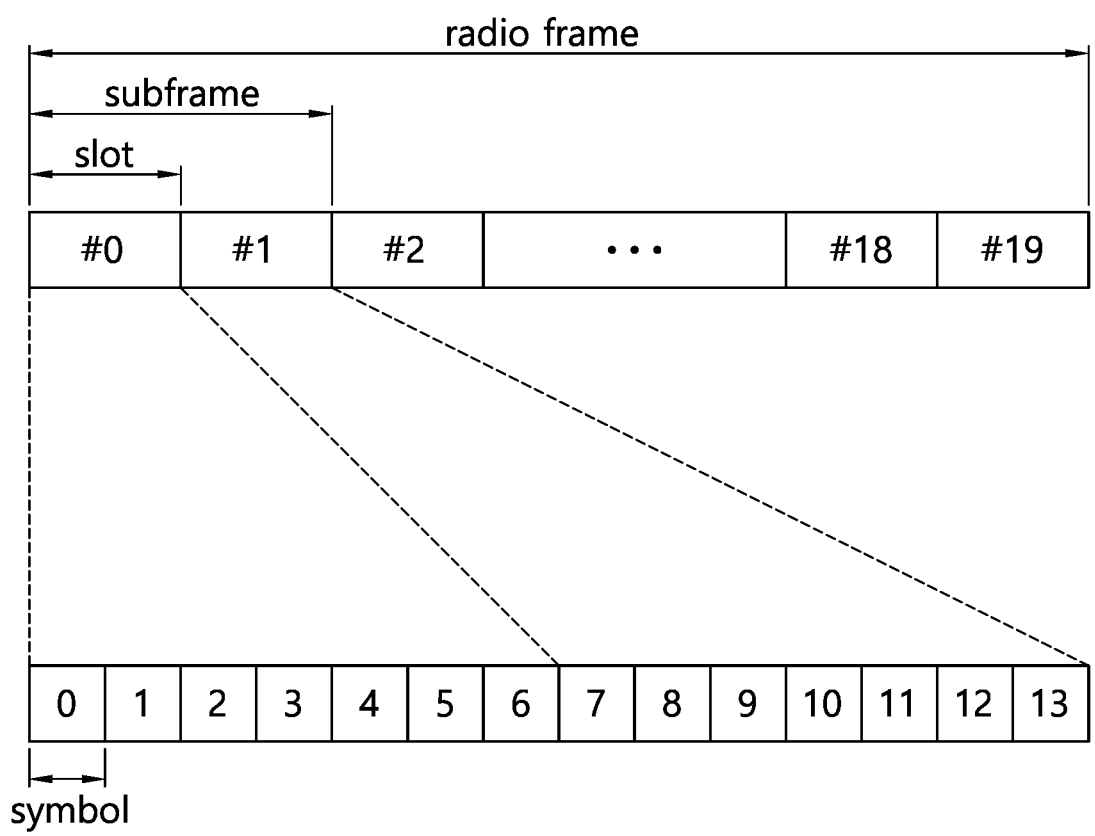
FIG. 2 shows the structure of a radio frame according to FDD in 3GPP LTE.

FIG. 2 Shows the Structure of a Radio Frame According to FDD in 3GPP LTE.

Referring to FIG. 2, a radio frame includes 10 subframes, and one subframe includes two slots. The slots in the radio frame are numbered from 0 to 19. The time it takes for one subframe to be transmitted is referred to as a transmission time interval (TTI). The TTI may be referred to as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame or the number of slots included in the subframe may be variously changed.

Meanwhile, one slot may include a plurality of orthogonal frequency division multiplexing (OFDM) symbols. How many OFDM symbols are included in one slot may vary according to a cyclic prefix (CP).

One slot includes NRB resource blocks (RBs) in a frequency domain. For example, in the LTE system, the number of resource blocks (RBs), that is, NRB may be any one of 6 to 110.

A resource block (RB) is a resource allocation unit and includes a plurality of subcarriers in one slot. For example, if one slot includes 7 OFDM symbols in the time domain and the resource block includes 12 subcarriers in the frequency domain, one resource block may include 7*12 resource elements (REs).

In 3GPP LTE, physical channels are divided into data channels, such as PDSCH (Physical Downlink Shared Channel) and PUSCH (Physical Uplink Shared Channel), and control channels, such as PDCCH (Physical Downlink Control Channel), PCFICH (Physical Control Format Indicator Channel), PHICH (Physical Hybrid-ARQ Indicator Channel) and PUCCH (Physical Uplink Control Channel).

The uplink channel includes PUSCH, PUCCH, SRS (Sounding Reference Signal), and PRACH (Physical Random Access Channel).

<Next-Generation Mobile Communication Network>

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

The ITU proposes three usage scenarios, for example, eMBB (enhanced Mobile BroadBand), mMTC (massive Machine Type Communication) and URLLC (Ultra Reliable and Low Latency Communications).

URLLC relates to usage scenarios that require high reliability and low latency. For example, services such as autonomous driving, factory automation, and augmented reality require high reliability and low latency (eg, latency of 1 ms or less). Currently, the delay time of 4G (LTE) is statistically 21-43 ms (best 10%) and 33-75 ms (median). This is insufficient to support services requiring latency of less than 1 ms. Next, the eMBB usage scenario relates to a usage scenario requiring mobile ultra-wideband.

That is, the 5th generation mobile communication system may target higher capacity than the current 4G LTE, increase the density of mobile broadband users, and support D2D (Device to Device), high stability, and MTC (Machine type communication). 5G R&D also aims to achieve lower latency and lower battery consumption than 4G mobile communication systems to better realize the Internet of Things. For such 5G mobile communication, a new radio access technology (New RAT or NR) may be proposed.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

<Operation Bands in NR>

The operating bands in NR are as follows.

The operating band of Table 3 below is an operating band converted from the operating band of LTE/LTE-A. This is called the FR1 band.

TABLE 3

| NR operation bands | Uplink operation bands $F_{UL\_low}$-$F_{UL\_high}$ | Downlink operation bands $F_{DL\_low}$-$F_{DL\_high}$ | Duple mode |
| --- | --- | --- | --- |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The table below shows the NR operating bands defined on the high frequency phase.

This is called the FR2 band.

TABLE 4

| NR operation bands | Uplink operation bands $F_{UL\_low}$-$F_{UL\_high}$ | Downlink operation bands $F_{DL\_low}$-$F_{DL\_high}$ | Duple mode |
| --- | --- | --- | --- |
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

Figure 3A:
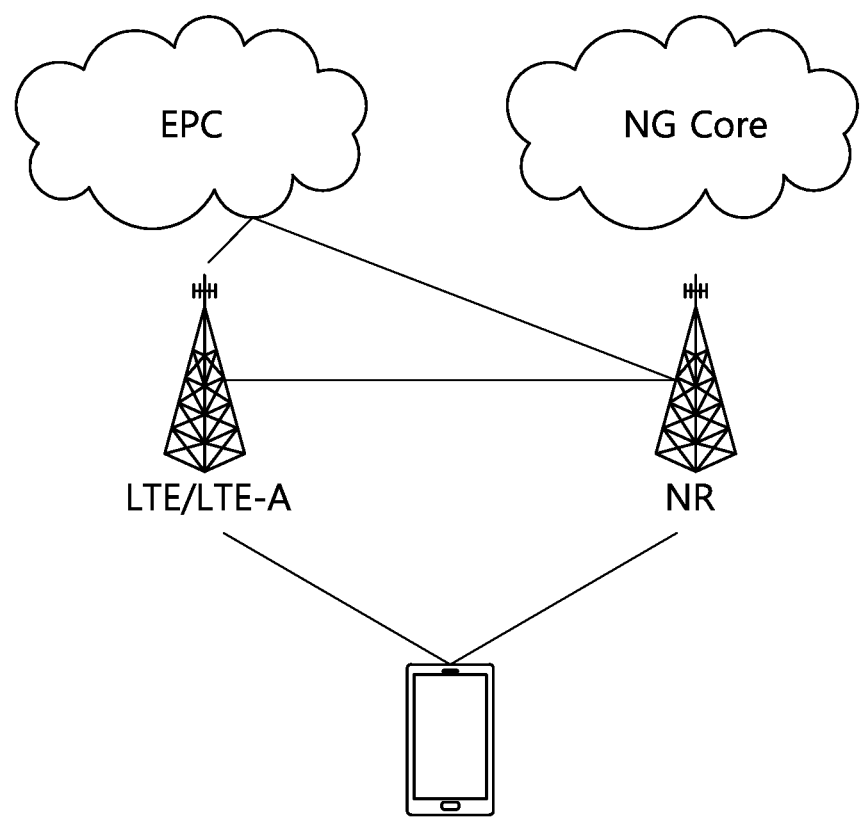
FIGS. 3a to 3c are exemplary diagrams illustrating an exemplary architecture for a service of next-generation mobile communication.
Figure 3B:
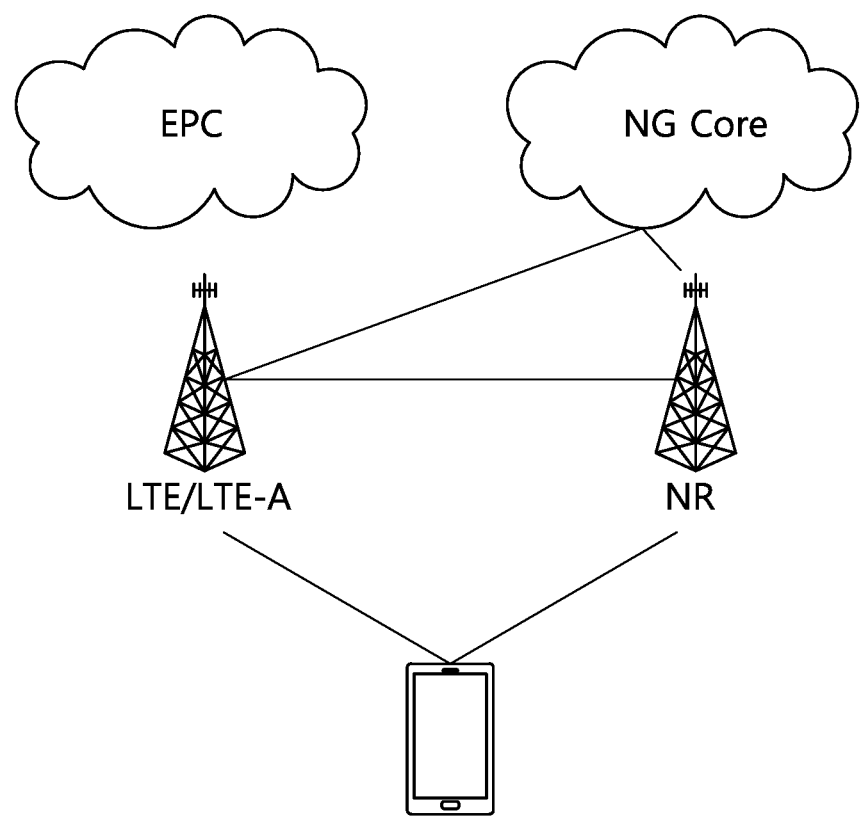
Figure 3C:
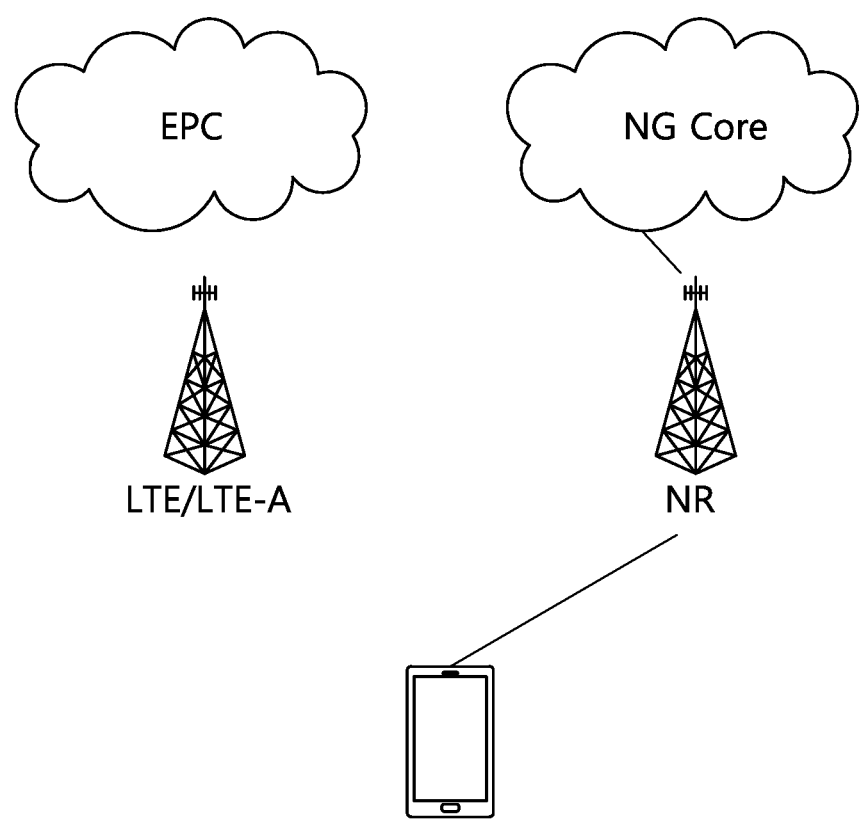

FIGS. 3a to 3c are Exemplary Diagrams Illustrating an Exemplary Architecture for a Service of Next-Generation Mobile Communication.

Referring to FIG. 3a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 3b, unlike FIG. 3a, an LTE/LTE-A-based cell is connected to a core network for 5G mobile communication, that is, the LTE/LTE-A-based cell is connected to a Next Generation (NG) core network.

A service method based on the architecture shown in FIG. 3a and FIG. 3b is referred to as NSA (non-standalone).

Referring to FIG. 3c, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 4:
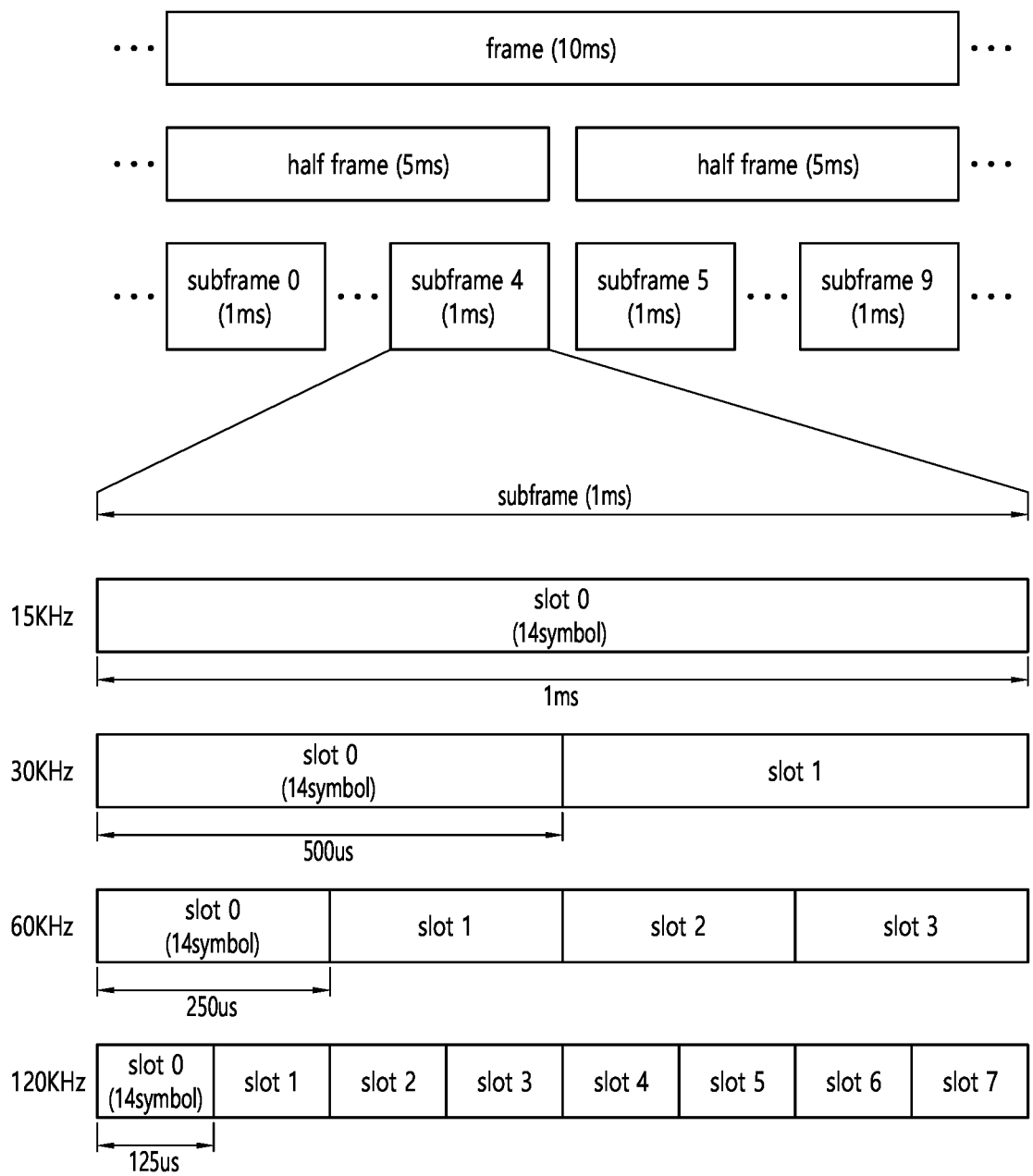
FIG. 4 illustrates structure of a radio frame used in NR.

FIG. 4 Illustrates Structure of a Radio Frame Used in NR.

In NR, uplink and downlink transmission consists of frames. A radio frame has a length of 10 ms and is defined as two 5 ms half-frames (Half-Frame, HF). A half-frame is defined as 5 1 ms subframes (Subframe, SF). A subframe is divided into one or more slots, and the number of slots in a subframe depends on SCS (Subcarrier Spacing). Each slot includes 12 or 14 OFDM(A) symbols according to CP (cyclic prefix). When CP is usually used, each slot includes 14 symbols. When the extended CP is used, each slot includes 12 symbols. Here, the symbol may include an OFDM symbol (or a CP-OFDM symbol) and an SC-FDMA symbol (or a DFT-s-OFDM symbol).

Figure 5:
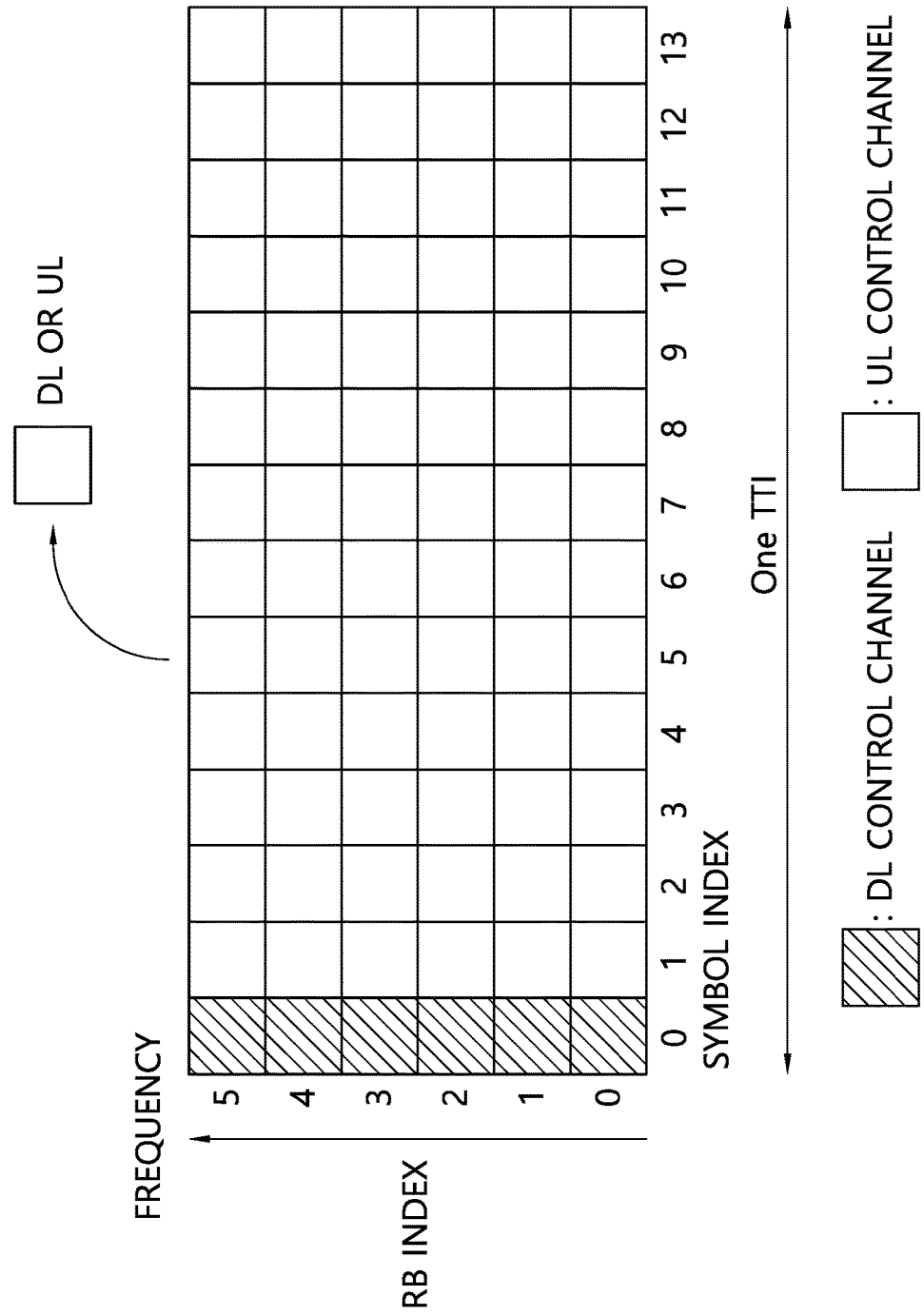
FIG. 5 shows an example of subframe types in NR.

FIG. 5 Shows an Example of Subframe Types in NR.

The TTI (transmission time interval) shown in FIG. 5 may be referred to as a subframe or a slot for NR (or new RAT). The subframe (or slot) of FIG. 5 may be used in a TDD system of NR (or new RAT) to minimize data transmission delay. As shown in FIG. 5, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot).

The structure of such a subframe (or slot) may be referred to as a self-contained subframe (or slot).

Specifically, the first N symbols in a slot may be used to transmit DL control channel (hereinafter, DL control region), and the last M symbols in a slot may be used to transmit UL control channel (hereinafter, UL control region). N and M are each an integer greater than or equal to 0. A resource region (hereinafter, referred to as a data region) between the DL control region and the UL control region may be used for DL data transmission or UL data transmission. For example, the PDCCH may be transmitted in the DL control region and the PDSCH may be transmitted in the DL data region. The PUCCH may be transmitted in the UL control region, and the PUSCH may be transmitted in the UL data region.

When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

TABLE 5

| M | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by $\mu$, the number of OLDM symbols per slot Nslotsymb, the number of slots per frame Nframe,μslot, and the number of slots per subframe Nsubframe,μslot are expressed as shown in the following table.

TABLE 6

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by $\mu$, the number of OLDM symbols per slot Nslotsymb, the number of slots per frame Nframe,μslot, and the number of slots per subframe Nsubframe,μslot are expressed as shown in the following table.

TABLE 7

| M | $N_{symb}^{slot}$ | $N_{slot}^{subframe, \mu}$ | $N_{slot}^{subframe, \mu}$ |
|---|---|---|---|
| 2 | 12 | 40 | 4 |

<Bandwidth Part: BWP>

In NR, broadband frequencies up to 400 MHz can be used. In order to allow various UEs to efficiently allocate and use frequency resources, NR introduces a new concept called BWP.

When the UEs perform initial access and transmit information about the capability of the UE to the base station, the base station sets the BWP to be used by the UE for each UE based on this information, and may transmit information on the BWP set to each UE. Then, downlink and uplink data transmission/reception between each UE and the base station is performed only through the BWP configured for each UE. That is, when the base station sets the BWP to the UE, the UE instructs not to use a frequency band other than the BWP when performing wireless communication with the base station thereafter.

The base station may set the entire band of the carrier frequency up to 400 MHz as the BWP for the UE, and may set only some bands as the BWP for the UE. In addition, the base station may configure multiple BWPs for one UE. When multiple BWPs are configured for one UE, the frequency bands of each BWP may or may not overlap each other.

<V2X (Vehicle-to-Everything)>

V2X (vehicle-to-everything) refers to communication technology through all interfaces with the vehicle. The implementation form of V2X may be as follows.

In V2X, 'X' may mean a person (Persian) or a pedestrian (PEDESTRIAN). In this case, V2X may be displayed as V2P (vehicle-to-person or vehicle-to-pedestrian). Here, the pedestrian is not necessarily limited to a person moving on foot, and may include a person riding a bicycle, a driver or a passenger of a vehicle (below a certain speed).

Alternatively, 'X' may be an infrastructure/network. In this case, V2X may be expressed as V2I (vehicle-to-infrastructure) or V2N (vehicle-to-network), and may mean communication between a vehicle and a roadside unit (ROADSIDE UNIT: RSU) or a vehicle and a network. The roadside device may be a device that informs traffic-related infrastructure, for example, a speed. The roadside device may be implemented in a base station or a fixed terminal.

Alternatively, 'X' in V2X may be a vehicle (VEHICLE). In this case, V2X may be expressed as V2V (vehicle-to-vehicle), and may mean communication between vehicles.

A wireless device mounted on a vehicle may be referred to as a V2V device or a V2X device.

Communication between V2X devices without going through a base station is called V2X communication, and a link used for communication between V2X devices is also called sidelink.

There are the followings as physical signals used in sidelink.

PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

In addition, there are the following physical signals used in sidelink.

Demodulation Reference signal (DMRS)
Sidelink Synchronization signal (SLSS)

The SLSS includes a primary sidelink synchronization signal (PSLSS) and a secondary sidelink synchronization signal (Secondary SLSS: SSLSS).

Figure 6:
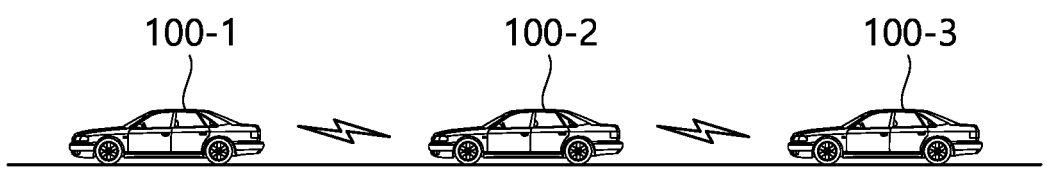
FIG. 6 is an exemplary diagram illustrating the concept of V2X.

FIG. 6 is an Exemplary Diagram Illustrating the Concept of V2X.

As can be seen with reference to FIG. 6, the wireless devices (ie, V2X devices) (100-1, 100-2, 100-3) mounted on the vehicle may communicate with each other.

<Problems to be Solved by the Disclosure of this Specification>

In 5G NR, four bandwidth parts (BWPs) can be configured for uplink or downlink in the terminal, and one BWP can be activated to perform communication.

On the other hand, a sidelink (sidelink) for V2X communication may be set to operate on a BWP (bandwidth part) different from the BWP for uplink. In this case, in order for the terminal (ie, the wireless communication device) to use the sidelink, it must change from the first BWP for the uplink to the second BWP for the sidelink, which result in a time delay.

Figure 7:
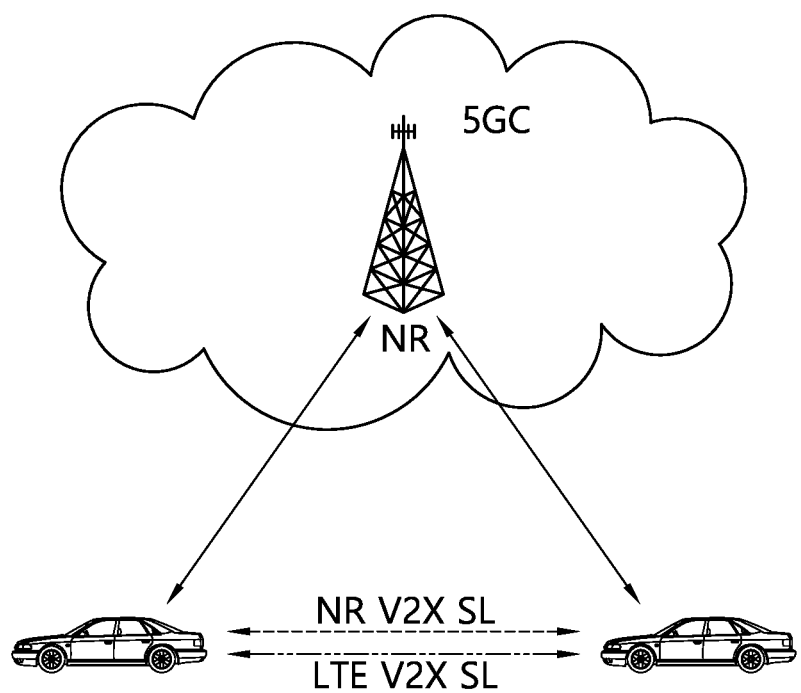
FIG. 7 shows an example of performing V2X communication using 5G NR.

FIG. 7 Shows an Example of Performing V2X Communication Using 5G NR.

As shown in FIG. 7, in 5G, a method of using V2X using a sidelink in a licensed band is being considered. In the case of 5G V2X sidelink using a licensed band, the terminal may set only one BWP to perform V2X communication.

The configuration of the BWP for the sidelink (eg, bandwidth, center frequency, subcarrier spacing, etc.) may be different from the configuration of the BWP for the uplink. Therefore, when the terminal intends to perform transmission/reception on the sidelink after performing transmission on the uplink, it is necessary to change the BWP configuration (ie, BWP switching). In the opposite case, that is, even when transmission is performed on the uplink after transmission/reception is performed on the sidelink, the terminal must change the BWP setting (ie, BWP switching). For BWP switching, since the terminal needs time to reset the parameters (eg, bandwidth, center frequency, subcarrier size, etc.) for RF (radio frequency) and baseband, the terminal needs a data/control signal during the time cannot send and receive In particular, since radio resources in the licensed band are shared and used in time division for sidelink and uplink, a time delay accompanying the terminal for BWP switching may degrade overall system performance.

Figure 8:
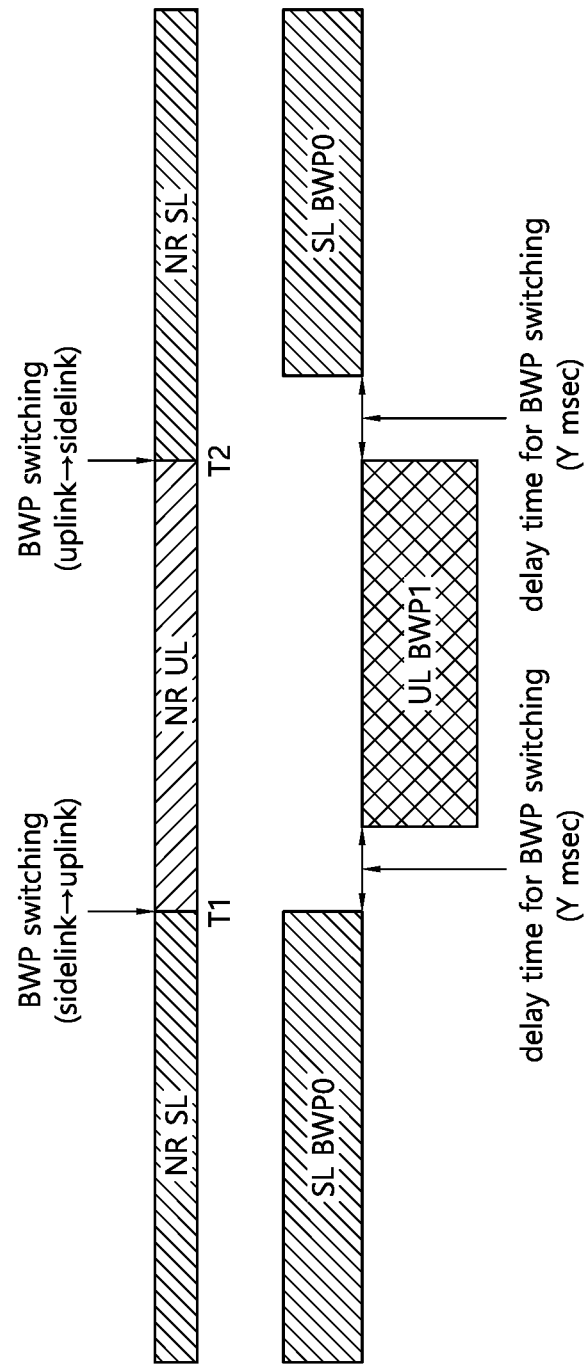
FIG. 8 shows an example of a time delay caused by BWP switching.

FIG. 8 Shows an Example of a Time Delay Caused by BWP Switching.

As shown in FIG. 8, the BWP configuration for the sidelink and the BWP configuration for the uplink may be different. The terminal should perform BWP switching in order to change to uplink BWP for uplink transmission at time T1, which is the end of a sidelink slot. For this reason, a time delay of Y msec occurs after time T1, and during this time, the terminal is unable to transmit on the uplink. Similarly, at the time T2 when the uplink slot ends, the UE performs BWP switching to change to the sidelink BWP for sidelink transmission/reception, so that transmission/reception to the sidelink may be limited for Y msec.

<Disclosures of the Present Specification>

Accordingly, the disclosure of the present specification proposes an NR and V2X system operation that minimizes system performance degradation by selectively applying the BWP switching delay time to the uplink and the sidelink according to network conditions (eg, traffic load) or services.

I. Setting According to Traffic Load

When V2X is used in the licensed band, it can be seen that the base station has information about downlink (DL)/uplink (UL) and sidelink (SL) traffic.

Accordingly, the base station may deliver an indication/information on when to change the BWP setting of the sidelink (SL) or downlink (DL)/uplink (UL) to the UE in consideration of the traffic load.

That is, the base station may transmit information about the BWP switching timing between the downlink (DL)/uplink (UL) and the sidelink (SL) to the UE.

The information on the BWP switching timing may be delivered to the UE through an RRC signal.

For example, the information on the BWP switching timing may include first BWP switching information (eg, SLUu-bwp-SwitchTime information) and second BWP switching information (eg, UuSL-bwp-SwitchTime information). The first BWP switching information (eg, SLUu-bwp-SwitchTime information) is a time value for BWP switching from sidelink (SL) to downlink (DL)/uplink (UL), and second BWP switching information (eg, UuSL)-bwp-SwitchTime information) is a time value for BWP switching from downlink (DL)/uplink (UL) to sidelink (SL).

For example, the base station may set that BWP switching to the sidelink (SL) should start before the time set by the second BWP switching information (eg, UuSL-bwp-SwitchTime information) at the time when the downlink/uplink is terminated.

TABLE 8

| ServingCellConfig | |
|---|---|
| SLUu-bwp-SwitchTime | ENUMERATED {ms0, ms0.5, ms1, ms1.5, ms2, ms2.5, ms3, spare1} |
| UuSL-bwp-SwitchTime | ENUMERATED {ms0, ms0.5, ms1, ms1.5, ms2, ms2.5, ms3, spare1} |

Figure 9:
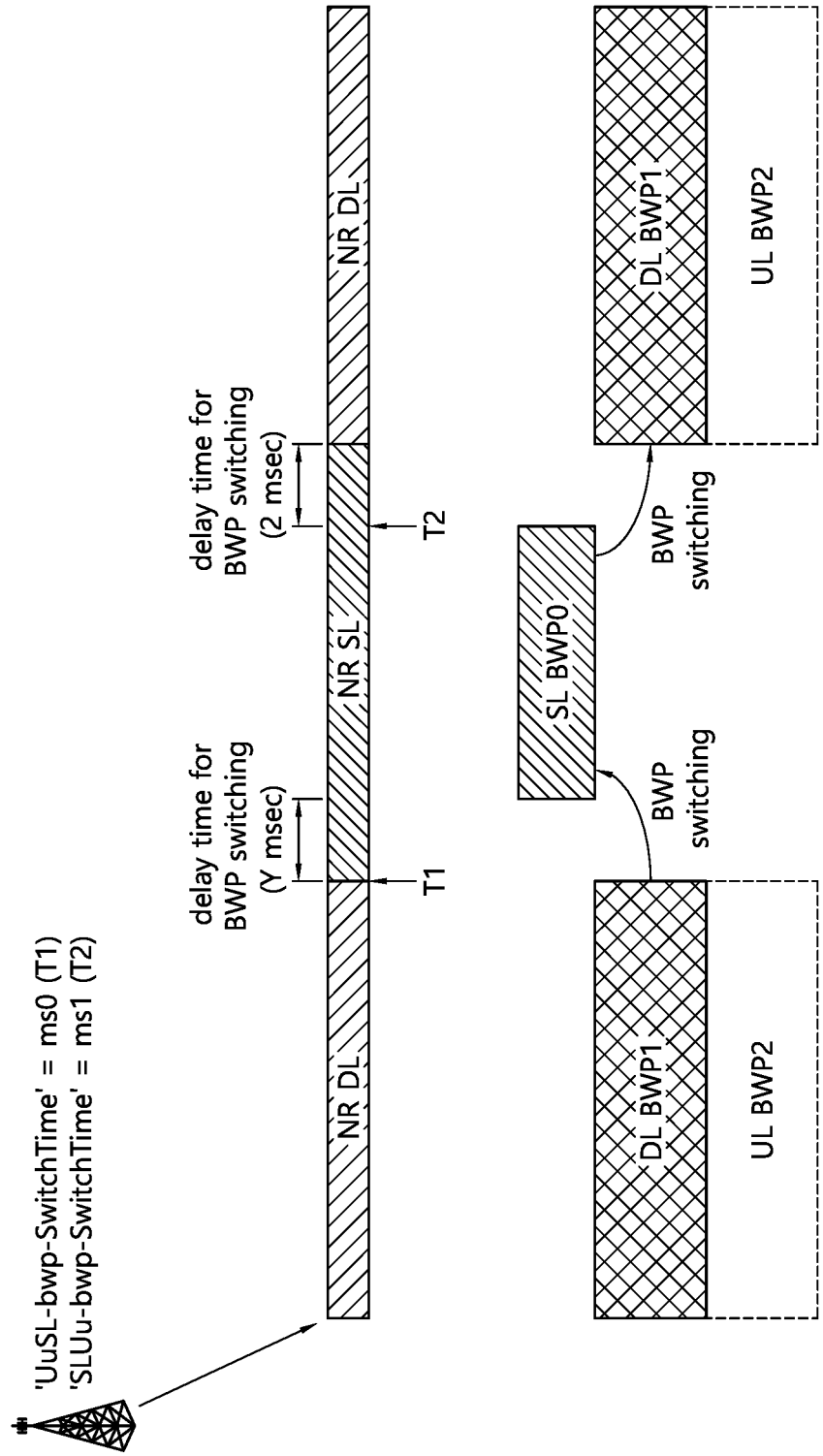
FIG. 9 shows an example of BWP switching from NR downlink to NR sidelink when NR downlink traffic is heavy.
Figure 10:
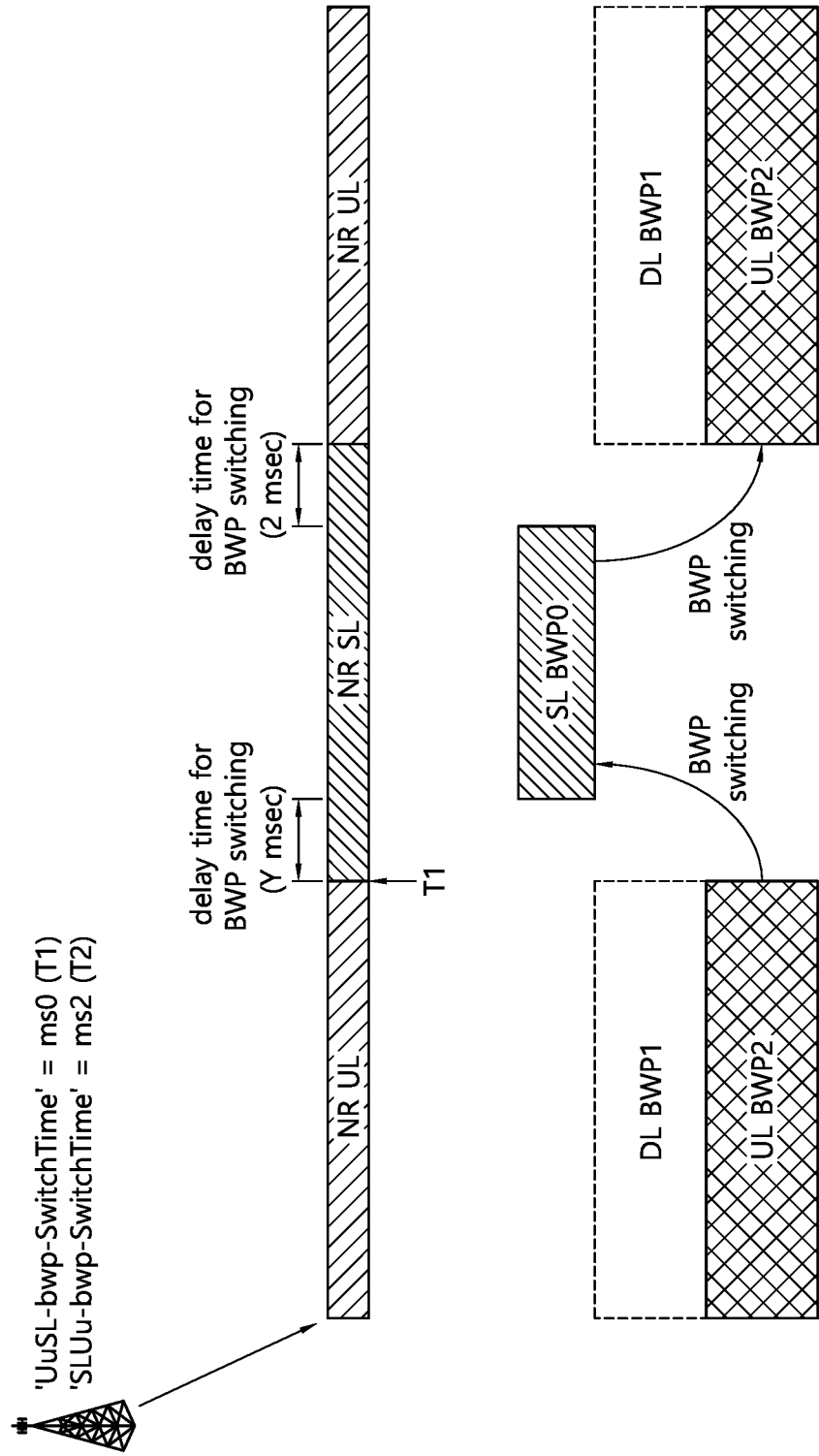
FIG. 10 shows BWP switching from NR uplink to NR sidelink when NR uplink traffic is heavy. shows an example.

FIG. 9 Shows an Example of BWP Switching from NR Downlink to NR Sidelink when NR Downlink Traffic is Heavy, and FIG. 10 Shows BWP Switching from NR Uplink to NR Sidelink when NR Uplink Traffic is Heavy. Shows an Example.

FIGS. 9 and 10 show examples of a case where the NR downlink (DL)/uplink (UL) traffic load is large.

When a second slot for downlink (DL) or uplink (UL) with the base station is located after the first slot for sidelink (SL), after the starting point of the second slot, before the first offset time based on the information, the first BWP switching from the sidelink (SL) to the downlink (DL) or uplink (UL) with the base station may be started.

In addition, when a second slot for downlink (DL) or uplink (UL) with the base station is located before the first slot for sidelink (SL), during the time based on the BWP switching information after the start point of the first slot, the second BWP switching from the downlink (DL) or uplink (UL) to the sidelink (SL) with the base station may be performed.

When the NR downlink (DL)/uplink (UL) traffic load is large, the base station may set BWP switching time to the sidelink (SL), that is, UuSL-bwp-SwitchTime information to ms0 to reduce the downlink (DL)/uplink (UL) scheduling constraint. When the UuSL-bwp-SwitchTime information is set to ms0, BWP switching may be started at the time T1 when the NR downlink (DL)/uplink (UL) ends.

In addition, the base station may set SLUu-bwp-SwitchTime information to ms1. When the SLUu-bwp-SwitchTime information is set to ms1, BWP switching may be performed in advance at the time T2 when the NR sidelink (SL) ends. Through this, the scheduling constraint of the base station for the NR downlink (DL)/uplink (UL) may be reduced. In this case, the BWP switching time is applied to the NR sidelink (SL), so the UE does not expect to transmit and receive the UE for Y msec and 2 msec in the NR SL.

Figure 11:
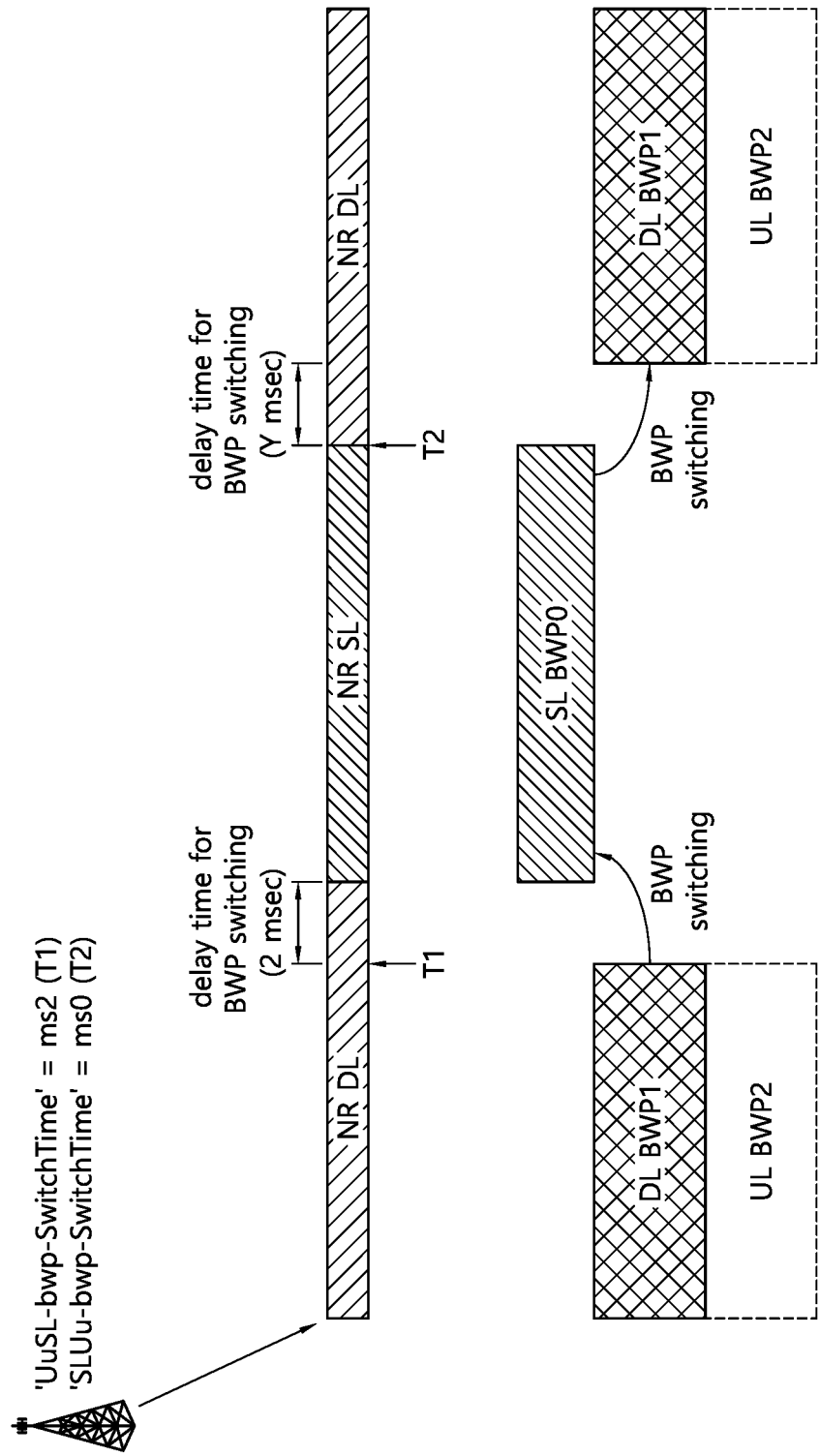
FIG. 11 shows an example of BWP switching from NR downlink to NR sidelink when traffic of NR downlink is small.
Figure 12:
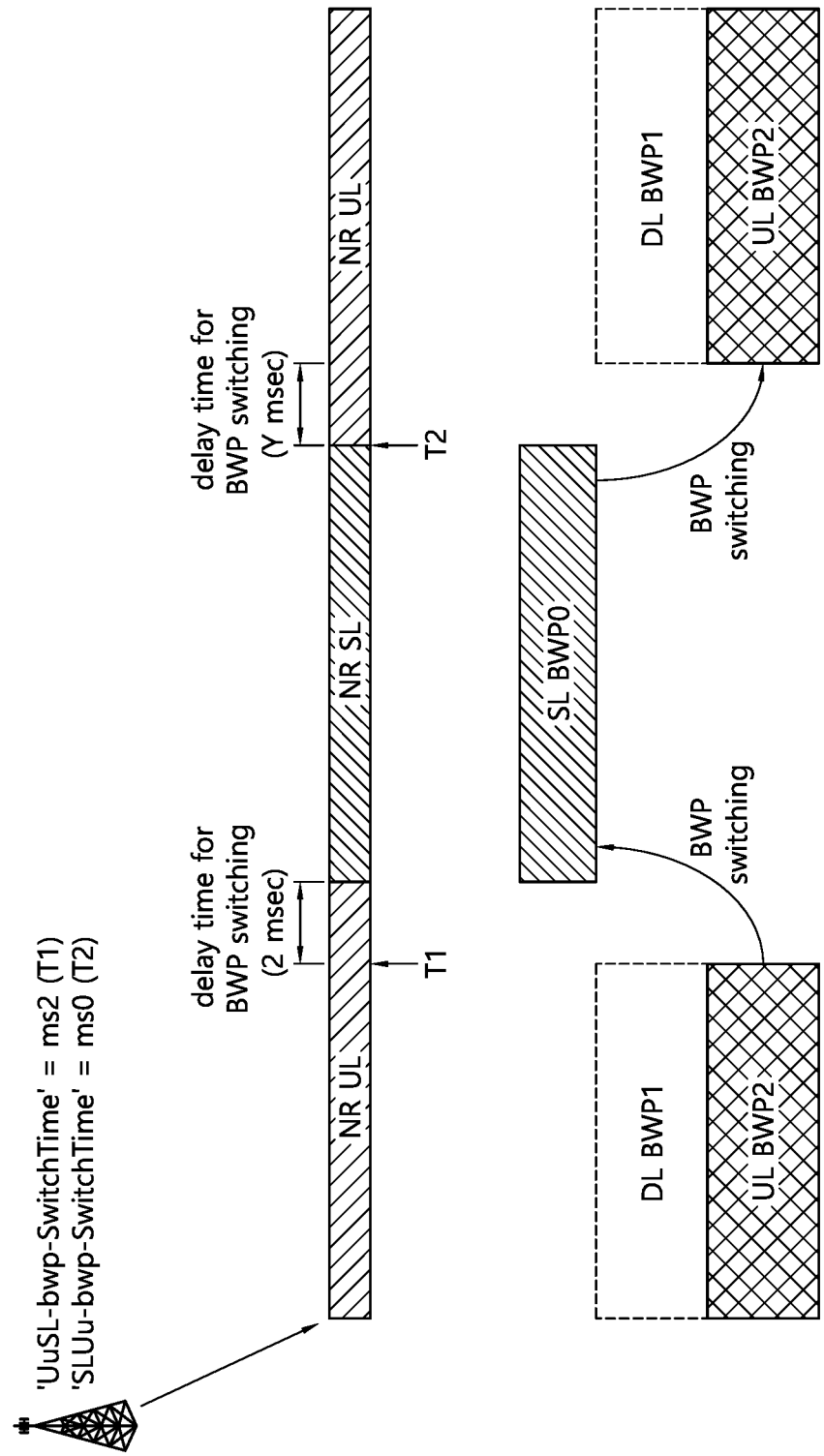
FIG. 12 is BWP switching from NR uplink to NR sidelink when traffic of NR uplink is small; An example of switching from NR sidelink to NR uplink is shown.

FIG. 11 Shows an Example of BWP Switching from NR Downlink to NR Sidelink when Traffic of NR Downlink is Small, and FIG. 12 is BWP Switching from NR Uplink to NR Sidelink when Traffic of NR Uplink is Small; an Example of Switching from NR Sidelink to NR Uplink is Shown.

FIGS. 11 and 12 show examples of BWP switching when the load of NR downlink/uplink traffic is small.

When a second slot for downlink (DL) or uplink (UL) with the base station is located after the first slot for sidelink (SL), during the information-based time after the starting point of the second slot, the first BWP switching from the sidelink (SL) to the downlink (DL) or uplink (UL) with the base station may be performed.

When a second slot for downlink (DL) or uplink (UL) with the base station is located before the first slot for sidelink (SL), after the start point of the first slot before the second offset time based on the information, the second BWP switching from the downlink (DL) or uplink (UL) to the sidelink (SL) with the base station may be start.

When the load of NR downlink (DL)/uplink (UL) traffic is small, the base station may set UuSL-bwp-SwitchTime information to a value other than ms0 (e.g., ms2) in order to secure resources for the sidelink (SL) and the base station may set SLUu-bwp-SwitchTime information to ms0.

Then, as shown in FIGS. 11 and 12, the UE may initiate BWP switching in the downlink (DL)/uplink (UL) section at the time T1, which is 2 ms before from the time when the NR downlink (DL)/uplink (UL) ends.

After completing the setting of the sidelink BWP, the UE may perform sidelink communication in the sidelink (SL) section. BWP switching to the NR downlink (DL)/uplink (UL) may be started at the time T2 when the sidelink (SL) is terminated.

Accordingly, it is possible to secure a resource for the NR sidelink.

Meanwhile, the UE may not expect transmission/reception during the delay time that occurs while performing NR downlink (DL)/uplink (UL) BWP switching.

Figure 13:
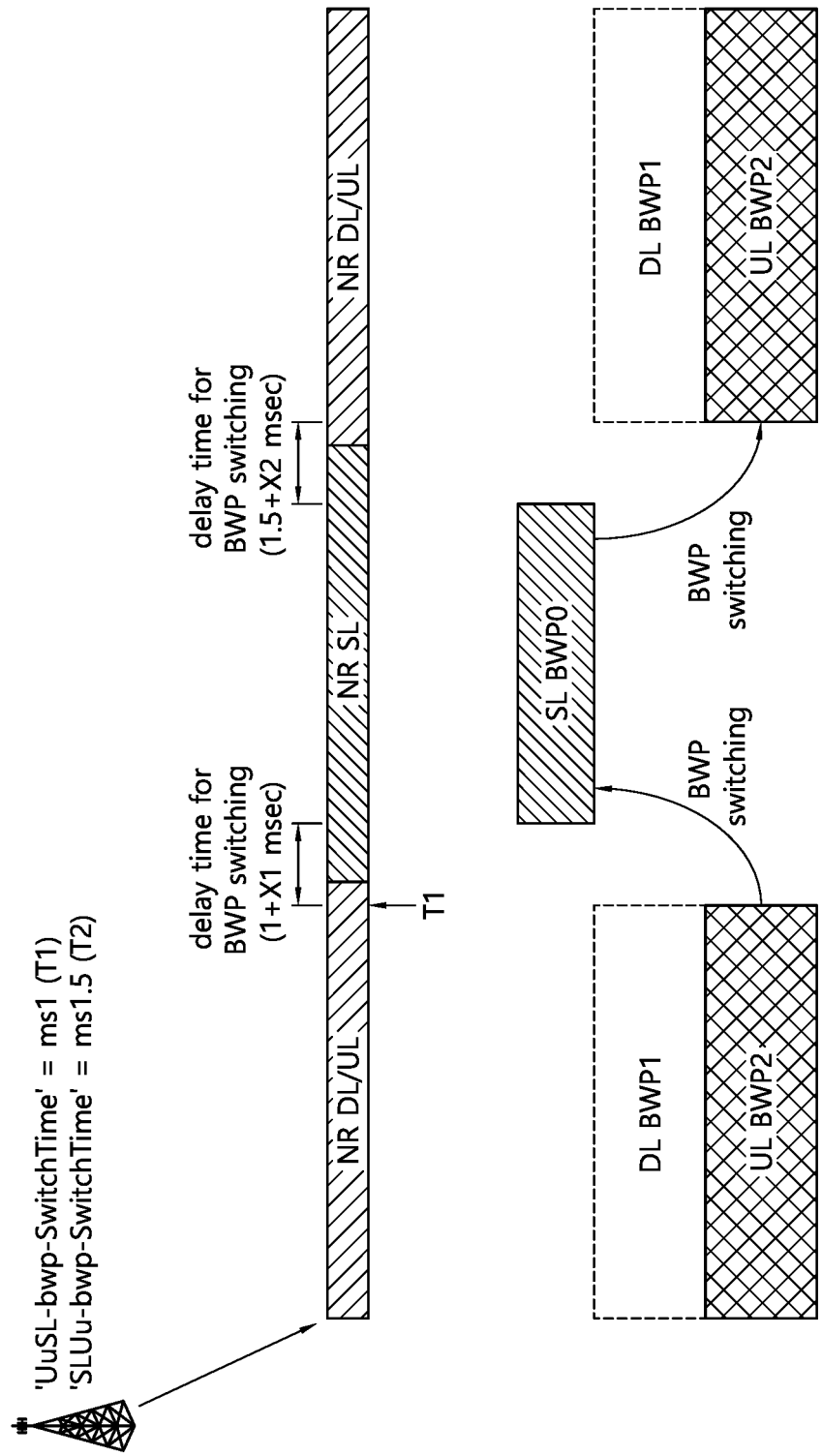
FIG. 13 shows an example of performing BWP switching regardless of a slot boundary.

FIG. 13 Shows an Example of Performing BWP Switching Regardless of a Slot Boundary.

As shown in FIG. 13, BWP switching may not be performed according to the slot boundary. That is, BWP switching may be performed over a slot for and a slot for NR.

During the delay time (e.g., 1+X1 msec) for BWP switching from NR downlink/uplink to sidelink to be performed, UE may not expected transmission and reception in NR downlink (DL)/uplink (UL) and sidelink (SL) communication. Similarly, During the delay time (e.g., 1.5+x2 msec) for BWP switching from sidelink to NR downlink/uplink to be performed, UE may not expected transmission and reception in NR downlink (DL)/uplink (UL) and sidelink (SL) communication.

In addition to the above-mentioned examples, the base station may flexibly set the BWP switching application time by using the setting values of SLUu-bwp-SwitchTime information and UuSL-bwp-SwitchTime information.

II. Setting According to Service Importance

When determining the BWP switching time in the downlink (DL)/uplink (UL) section or the sidelink (SL) section, the service importance of the sidelink may be considered. For this, the concept of PPPP (ProSe Per-Packet Priority) defined in LTE V2X may be reused. When the PPPP of a data packet transmitted on the sidelink is high, in order to guarantee resources for the sidelink, the base station may set UuSL-bwp-SwitchTime information to a value other than ms0 (eg. ms2), and SLUu-bwp-SwitchTime information to ms0. Then, as shown in FIGS. 11 and 12, the UE may complete BWP switching in the downlink (DL)/uplink (UL) section. Conversely, when the PPPP of the data packet transmitted on the sidelink is low, the base station may set the UuSL-bwp-SwitchTime information to ms0 and the SLUu-bwp-SwitchTime information to a value other than ms0 (eg, ms2). Then, as shown in FIGS. 9 and 10, BWP switching may be performed at the end of the downlink (DL)/uplink (UL) period.

III. Terminal RF Setting in Licensed Band V2X

In general, the time delay that occur during performing BWP switching includes reset time in the RF and baseband to change the BWP setting (ie, bandwidth, center frequency, subcarrier size).

In order to minimize the above delay time when using V2X in the licensed band, the bandwidth and center frequency, which are RF-related set values, may be configured to cover both the downlink/uplink BWP and the sidelink BWP. Then, the time for RF resetting in the BWP switching delay may be reduced.

When the size of a subcarrier is changed due to BWP switching, since a reset time is required only in the baseband of the modem, the overall delay time may be reduced. For example, if the bandwidth of the uplink BWP is 40 MHz and the bandwidth of the sidelink BWP is set to 20 MH, for covering the uplink BWP and the side link BWP, the UE sets the RF bandwidth to 40 MHz and the center frequency to related value.

The communication device may be: a vehicle-to-everything (V2X) device mounted on a vehicle, a robot, or a smart phone.

IV. Devices in General to which the Disclosure of the Present Specification May be Applied The disclosures of the present specification described so far may be implemented through various means. For example, the disclosures of the present specification may be implemented by hardware, firmware, software, or a combination thereof. Specifically, it will be described with reference to the drawings.

Figure 14:
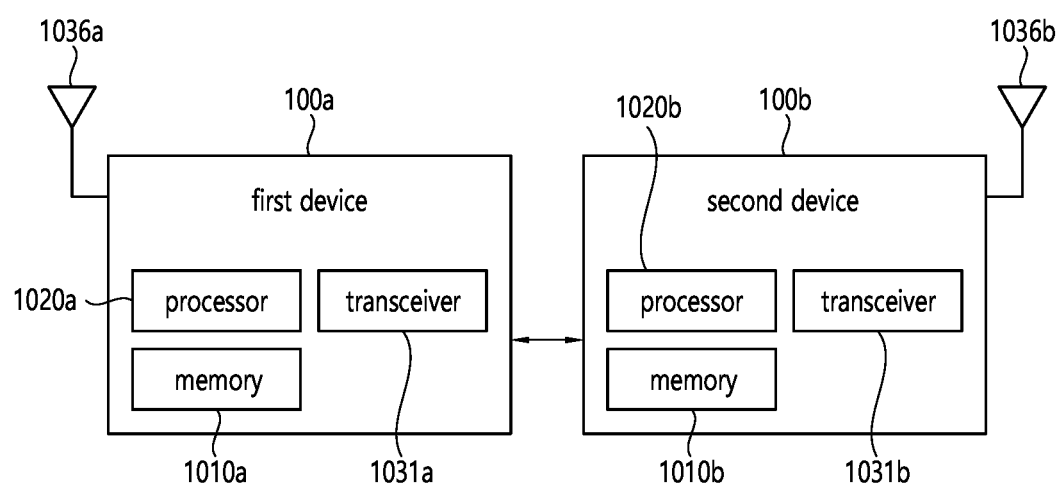
FIG. 14 shows an apparatus according to an embodiment.

FIG. 14 Shows an Apparatus According to an Embodiment.

Referring to FIG. 14, a wireless communication system may include a first device (100*a*) and a second device (100*b*).

The first device (100*a*) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The second device (100*b*) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The first device (100*a*) includes at least one processor, such as a processor (1020*a*), and at least one memory, such as a memory (1010*a*), it may include at least one transceiver, such as transceiver (1031*a*). The processor (1020*a*) may perform the functions, procedures, and/or methods described above. The processor (1020*a*) may perform one or more protocols. For example, the processor (1020*a*) may perform one or more layers of an air interface protocol. The memory (1010*a*) is connected to the processor (1020*a*) and may store various types of information and/or commands. The transceiver (1031*a*) may be connected to the processor (1020*a*) and may be controlled to transmit/receive a wireless signal.

The second device (100*b*) may include at least one processor such as a processor (1020*b*), at least one memory device such as a memory (1010*b*), and at least one transceiver such as a transceiver (1031*b*). The processor (1020*b*) may perform the functions, procedures, and/or methods described above. The processor (1020*b*) may implement one or more protocols. For example, the processor (1020*b*) may implement one or more layers of an air interface protocol. The memory (1010*b*) is connected to the processor (1020*b*) and may store various types of information and/or commands. The transceiver (1031*b*) may be connected to the processor (1020*b*) and may be controlled to transmit/receive a wireless signal.

The memory (1010*a*) and/or the memory (1010*b*) may be respectively connected inside or outside the processor (1020*a*) and/or the processor (1020*b*), and may be connected to other processors through various technologies such as wired or wireless connection.

The first device (100*a*) and/or the second device (100*b*) may have one or more antennas. For example, antenna (1036*a*) and/or antenna (1036*b*) may be configured to transmit and receive wireless signals.

Figure 15:
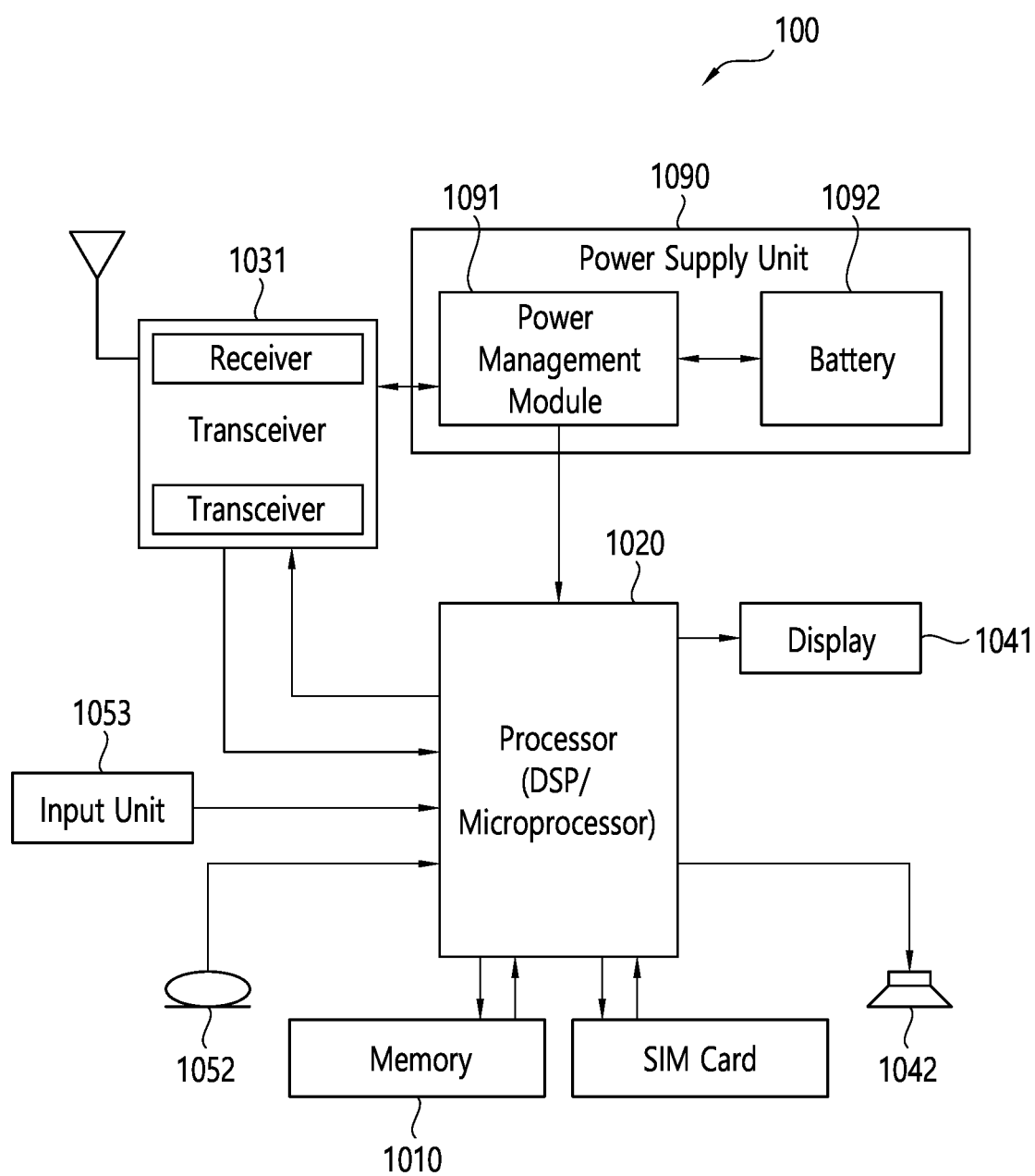
FIG. 15 is a block diagram illustrating the configuration of a terminal according to an embodiment.

FIG. 15 is a Block Diagram Illustrating the Configuration of a Terminal According to an Embodiment.

In particular, FIG. 15 is a diagram illustrating the apparatus of FIG. 14 in more detail above.

The device includes a memory (1010), a processor (1020), a transceiver (1031), a power management module (1091), a battery (1092), a display (1041), an input unit (1053), a speaker (1042) and a microphone (1052), SIM (subscriber identification module) card, and one or more antennas.

The processor (1020) may be configured to implement the proposed functions, procedures and/or methods described herein. The layers of the air interface protocol may be implemented in the processor (1020). The processor (1020) may include an application-specific integrated circuit (ASIC), other chipsets, logic circuits, and/or data processing devices. The processor (1020) may be an AP (application processor). The processor (1020) may include at least one of a DSP (digital signal processor), a CPU (central processing unit), a GPU (graphics processing unit), and a modem (modulator and demodulator). Examples of processor (1020) include SNAPDRAGON™ series processors manufactured by Qualcomm®, EXYNOS™ series processors manufactured by Samsung®, A series processors manufactured by Apple®, HELIO™ series processors manufactured by MediaTek®, ATOM™ series processor manufactured by INTEL® or a corresponding next-generation processor.

The power management module (1091) manages power for the processor (1020) and/or the transceiver (1031). The battery (1092) supplies power to the power management module (1091). The display (1041) outputs the result processed by the processor (1020). Input (1053) receives input to be used by processor (1020). The input unit (1053) may be displayed on the display (1041). A SIM card is an integrated circuit used to securely store an IMSI (international mobile subscriber identity) and associated keys used to identify and authenticate subscribers in mobile phone devices such as mobile phones and computers. Many SIM cards can also store contact information.

The memory (1010) is operatively coupled to the processor (1020), and stores various information for operating the processor (610). Memory (1010) may include ROM (read-only memory), RAM (random access memory), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory (1010) and executed by processor (1020). The memory (1010) may be implemented inside the processor (1020). Alternatively, the memory (1010) may be implemented outside the processor (1020), and may be communicatively connected to the processor (1020) through various means known in the art.

The transceiver (1031) is operatively coupled to the processor (1020) and transmits and/or receives a radio signal. The transceiver (1031) includes a transmitter and a receiver. The transceiver (1031) may include a baseband circuit for processing a radio frequency signal. The transceiver controls one or more antennas to transmit and/or receive radio signals. The processor (1020) transmits command information to the transceiver (1031) to transmit, for example, a radio signal constituting voice communication data to initiate communication. The antenna functions to transmit and receive radio signals. When receiving a wireless signal, the transceiver (1031) may transmit the signal for processing by the processor (1020) and convert the signal to a baseband. The processed signal may be converted into audible or readable information output through the speaker (1042).

The speaker (1042) outputs sound related results processed by the processor (1020). Microphone (1052) receives sound related input to be used by processor (1020).

The user inputs command information such as a phone number by, for example, pressing (or touching) a button of the input unit (1053) or voice activation using the microphone (1052). The processor (1020) receives such command information and processes it to perform an appropriate function, such as making a call to a phone number. Operational data may be extracted from the SIM card or the memory (1010). In addition, the processor (1020) may display command information or display information on the display (1041) for the user to recognize and for convenience.

Figure 16:
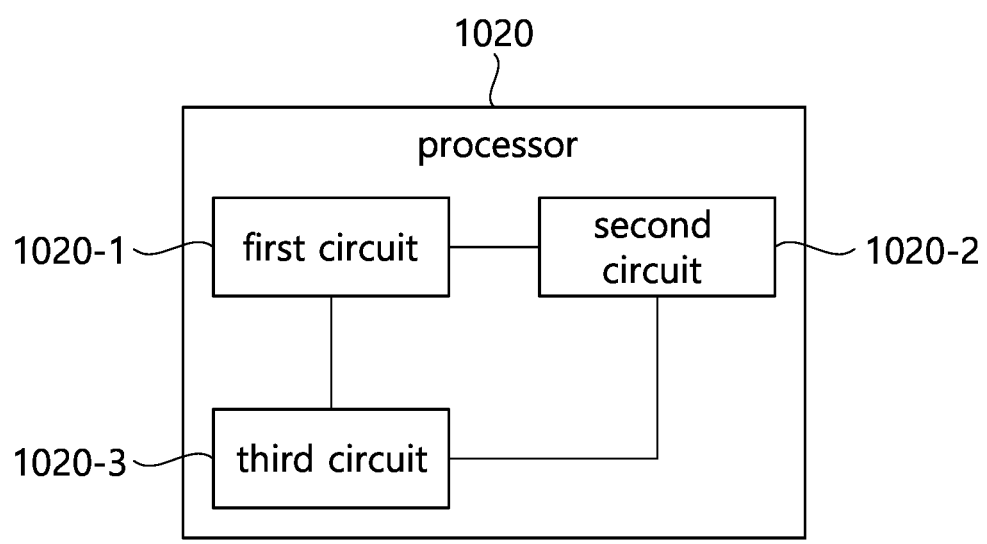
FIG. 16 shows a block diagram of a processor in which the disclosure of the present specification is implemented.

FIG. 16 Shows a Block Diagram of a Processor in which the Disclosure of the Present Specification is Implemented.

As can be seen with reference to FIG. 16, in order that the proposed functions, procedures and/or methods described in the disclosure of this specification is implemented, a processor (1020) may include a plurality of circuitry. For example, the processor (1020) may include a first circuit (1020-1), a second circuit (1020-2), and a third circuit (1020-3). Also, although not shown, the processor (1020) may include more circuits. Each circuit may include a plurality of transistors.

The first circuit 1020-1 may receive information on bandwidth part (BWP) switching timing from the base station.

The second circuit 1020-2 may perform BWP switching based on the information on the BWP switching timing.

The information on the BWP switching timing may include first BWP switching information or second BWP switching information. The first BWP switching information may be time information for BWP switching from the sidelink (SL) to the downlink (DL) or uplink (UL) with the base station. The second BWP switching information may be time information for BWP switching from downlink (DL) or uplink (UL) with the base station to sidelink (SL).

The third circuit 1020-3 performs a first BWP switching from the sidelink (SL) to a downlink (DL) or an uplink (UL) with the base station based on the first BWP switching information. can When a second slot for downlink (DL) or uplink (UL) with the base station is located after the first slot for sidelink (SL), after the starting point of the second slot before first offset time based on the first BPW switching information, the first BWP switching may be started.

When a second slot for downlink (DL) or uplink (UL) with the base station is located after the first slot for sidelink (SL), during time based on the first BWP switching information after the starting point of the second slot, the first BWP switching may be performed.

The fourth circuit (not shown) may perform a second BWP switching from the downlink (DL) or uplink (UL) with the base station to the sidelink (SL) based on the second BWP switching information.

When a second slot for downlink (DL) or uplink (UL) with the base station is located before the first slot for sidelink (SL), during time based on the second BWP switching information after the start point of the first slot, the second BWP switching may be performed.

When a second slot for downlink (DL) or uplink (UL) with the base station is located before the first slot for sidelink (SL), after the start point of the first slot before the second offset time based on the second BWP switching information, the second BWP switching may be started.

Information on the BWP switching timing may be received through an RRC signal.

The BWP switching may include: a change in bandwidth, a change in a center frequency, or a change in subcarrier spacing.

The information on the BWP switching timing may be determined based on a ProSe Per-Packet Priority (PPPP) of a data packet transmitted on the sidelink SL.

The processor 1020 may be referred to as an application-specific integrated circuit (ASIC) or an application processor (AP), and may include at least one of a digital signal processor (DSP), a central processing unit (CPU), and a graphics processing unit (GPU).

Figure 17:
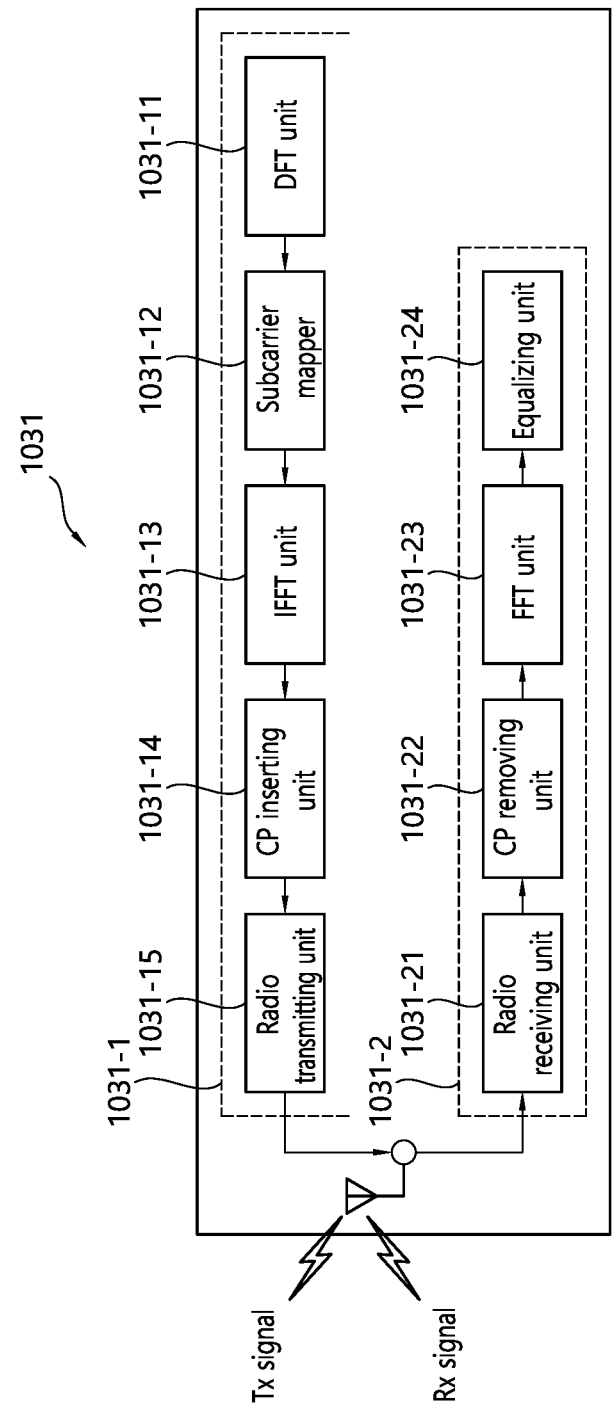
FIG. 17 is a detailed block diagram illustrating the transceiver of the first device shown in FIG. 14 or the transceiver of the device shown in FIG. 15 in detail.

FIG. 17 is a Detailed Block Diagram Illustrating the Transceiver of the First Device Shown in FIG. 14 or the Transceiver of the Device Shown in FIG. 15 in Detail.

Referring to FIG. 17, the transceiver (1031) includes a transmitter (1031-1) and a receiver (1031-2). The transmitter (1031-1) includes a Discrete Fourier Transform (DFT) unit (1031-11), a subcarrier mapper (1031-12), an IFFT unit (1031-13) and a CP insertion unit (1031-14), and a wireless transmitter (1031-15). The transmitter (1031-1) may further include a modulator. In addition, for example, a scramble unit (not shown; scramble unit), a modulation mapper (not shown; modulation mapper), a layer mapper (not shown; layer mapper) and a layer permutator (not shown; layer permutator) may be further included, this may be disposed before the DFT unit (1031-11). That is, in order to prevent an increase in PAPR (peak-to-average power ratio), the transmitter (1031-1) passes information through the DFT (1031-11) before mapping a signal to a subcarrier. After subcarrier mapping is performed on the signal spread (or precoded in the same sense) by the DFT unit (1031-11) through the subcarrier mapper (1031-12), an IFFT (Inverse Fast Fourier Transform) unit (1031-13) to make it a signal on the time axis.

The DFT unit (1031-11) outputs complex-valued symbols by performing DFT on input symbols. For example, when Ntx symbols are input (however, Ntx is a natural number), the DFT size is Ntx. The DFT unit (1031-11) may be called a transform precoder. The subcarrier mapper (1031-12) maps the complex symbols to each subcarrier in the frequency domain. The complex symbols may be mapped to resource elements corresponding to resource blocks allocated for data transmission. The subcarrier mapper (1031-12) may be referred to as a resource element mapper. The IFFT unit (1031-13) outputs a baseband signal for data that is a time domain signal by performing IFFT on an input symbol. The CP insertion unit (1031-14) copies a part of the rear part of the base band signal for data and inserts it into the front part of the base band signal for data. ISI (Inter-symbol interference) and ICI (Inter-Carrier Interference) are prevented through CP insertion, so that orthogonality can be maintained even in a multi-path channel.

On the other hand, the receiver (1031-2) includes a radio receiver (1031-21), a CP remover (1031-22), an FFT unit (1031-23), and an equalizer (1031-24). The radio receiving unit (1031-21), the CP removing unit (1031-22), and the FFT unit (1031-23) of the receiver (1031-2) include the radio transmitting unit (1031-15) in the transmitting end (1031-1), It performs the reverse function of the CP insertion unit (1031-14) and the IFF unit (1031-13). The receiver (1031-2) may further include a demodulator.

V. Examples to which the Disclosure of the Present Specification can be Applied

Although not limited thereto, the various descriptions, functions, procedures, suggestions, methods, and/or flow charts of the disclosure of the present specification disclosed may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 18:
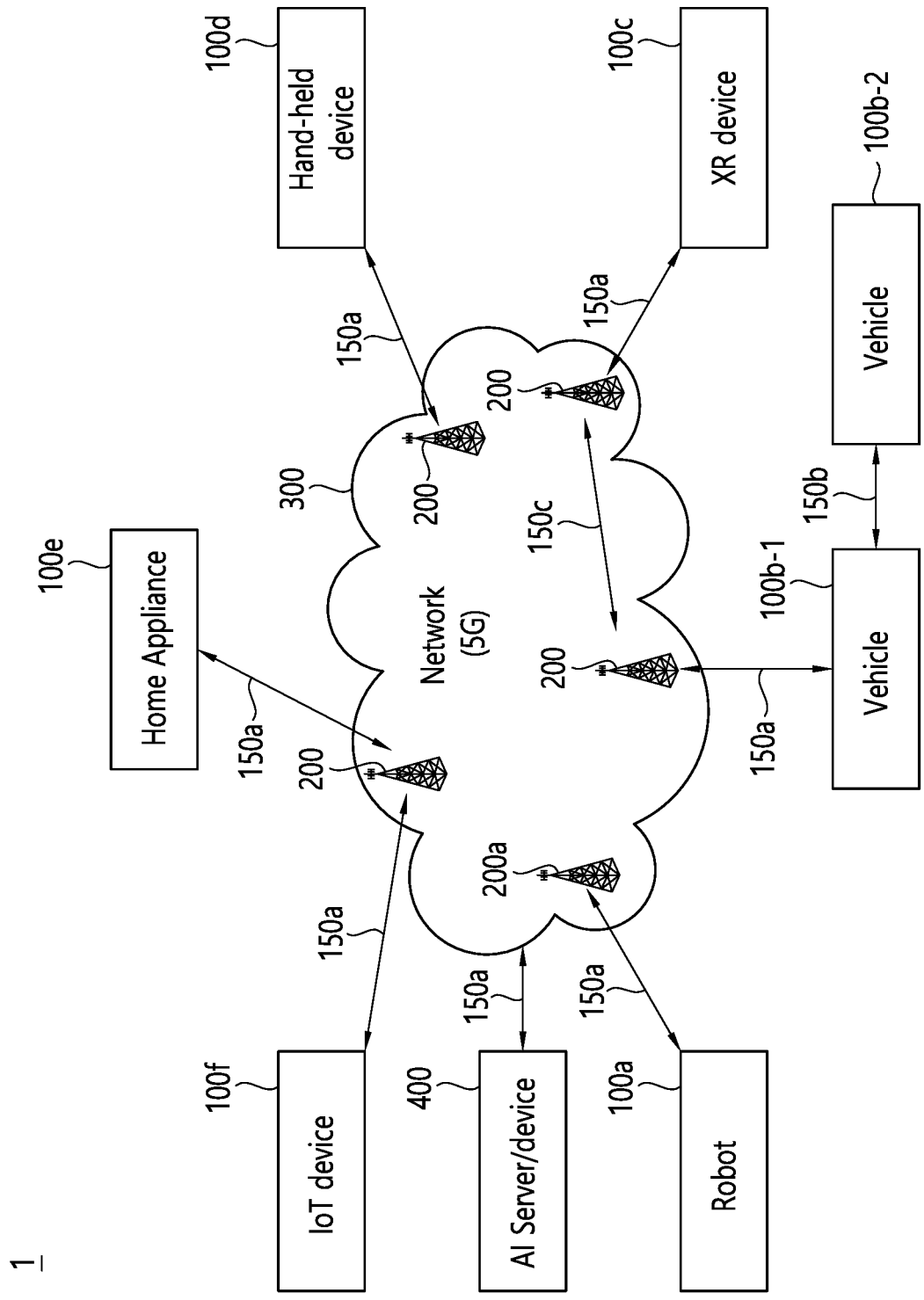
FIG. 18 illustrates a communication system 1 applied to the disclosure of the present specification.

FIG. 18 Illustrates a Communication System 1 Applied to the Disclosure of the Present Specification.

Referring to FIG. 18, a communication system (1) applied to the disclosure of the present specification includes a wireless device, a base station, and a network. Here, the wireless device may mean a device that performs communication using a wireless access technology (eg, 5G NR (New RAT), LTE (Long Term Evolution)), and may be referred to as a communication/wireless/5G device. Although not limited thereto, the wireless device may include a robot (100a), a vehicle (100b-1, 100b-2), an XR (eXtended Reality) device (100c), a hand-held device (100d, and a home appliance (100e), an IoT (Internet of Thing) device (100f), and an AI device/server (400). For example, the vehicle may include a vehicle equipped with a wireless communication function, an autonomous driving vehicle, a vehicle capable of performing inter-vehicle communication, and the like. Here, the vehicle may include an UAV (Unmanned Aerial Vehicle) (eg, a drone). XR devices include AR (Augmented Reality)/VR (Virtual Reality)/MR (Mixed Reality) devices, and include a HMD (Head-Mounted Device), a HUD (Head-Up Display) provided in a vehicle, a television, a smartphone, It may be implemented in the form of a computer, a wearable device, a home appliance, a digital signage, a vehicle, a robot, and the like. The portable device may include a smart phone, a smart pad, a wearable device (eg, a smart watch, smart glasses), a computer (eg, a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device (200a) may operate as a base station/network node to other wireless devices.

The wireless devices (100a-100f) may be connected to the network (300) through the base station (200). AI (Artificial Intelligence) technology may be applied to the wireless devices (100a-100f), and the wireless devices (100a-100f) may be connected to the AI server (400) through the network (300). The network (300) may be configured using a 3G network, a 4G (eg, LTE) network, or a 5G (eg, NR) network.

The wireless devices (100a-100f) may communicate with each other through the base station (200)/network (300), but may also communicate directly (e.g. sidelink communication) without passing through the base station/network. For example, the vehicles (100b-1, 100b-2) may perform direct communication (e.g. Vehicle to Vehicle (V2V)/Vehicle to everything (V2X) communication). In addition, the IoT device (eg, sensor) may directly communicate with other IoT devices (eg, sensor) or other wireless devices (100a-100f).

Wireless communication/connection (150a, 150b, and 150c) may be performed between the wireless devices (100a-100f)/base station (200) and the base station (200)/base station (200). Here, the wireless communication/connection includes uplink/downlink communication (150a) and sidelink communication (150b) (or D2D communication), and communication between base stations (150c) (eg relay, IAB (Integrated Access Backhaul)). This can be done through technology (eg 5G NR) Wireless communication/connection (150a, 150b, 150c) allows the wireless device and the base station/radio device, and the base station and the base station to transmit/receive wireless signals to each other. For example, the wireless communication/connection (150a, 150b, and 150c) may transmit/receive a signal through various physical channels. To this end, based on various proposals of the present specification, At least some of various configuration information setting process for transmission/reception of a wireless signal (eg, channel encoding/decoding, modulation/demodulation, resource mapping/demapping, etc.), resource allocation process and etc may be performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. have. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method, comprising:
obtaining, by a device, configuration information related to a first slot for uplink or downlink communication;
obtaining, by the device, configuration information related to a second slot for sidelink communication; and
performing, by the device, switching between the uplink or downlink communication and the sidelink communication at a switching time, wherein, based on (i) the switching from the uplink or downlink communication to the sidelink communication and (ii) the sidelink communication having higher priority than the uplink or downlink communication, the switching time is located on a last portion within the first slot, and wherein, based on (i) the switching from the sidelink communication to the uplink or downlink communication and (ii) the sidelink communication having lower priority than the uplink or downlink communication, the switching time is located on a last portion within the second slot.

2. The method of claim 1, wherein, based on (i) the switching from the uplink or downlink communication to the sidelink communication, and (ii) the sidelink communication having lower priority than the uplink or downlink communication, the switching time is located on a first portion within the second slot.

3. The method of claim 1, wherein the switching between the uplink or downlink communication and the sidelink communication is performed based on priority information of the sidelink communication.

4. The method of claim 1, wherein, based on (i) the switching from the sidelink communication to the uplink or downlink communication and (ii) the sidelink communication having higher priority than the uplink or downlink communication, the switching time is located on a first portion within the first slot.

5. A device, comprising:
at least one transceiver;
at least one processor; and
at least one memory connected to the at least one processor and storing instructions that, based on being executed by the at least one processor, cause the device to perform operations comprising:
obtaining configuration information related to a first slot for uplink or downlink communication;
obtaining configuration information related to a second slot for sidelink communication; and
performing switching between the uplink or downlink communication and the sidelink communication at a switching time,
wherein, based on (i) the switching from the uplink or downlink communication to the sidelink communication and (ii) the sidelink communication having higher priority than the uplink or downlink communication, the switching time is located on a last portion within the first slot, and
wherein, based on (i) the switching from the sidelink communication to the uplink or downlink communication and (ii) the sidelink communication having lower priority than the uplink or downlink communication, the switching time is located on a last portion within the second slot.

6. The device of claim 5, wherein, based on (i) the switching from the uplink or downlink communication to the sidelink communication, and (ii) the sidelink communication having lower priority than the uplink or downlink communication, the switching time is located on a first portion within the second slot.

7. The device of claim 5, wherein the switching between the uplink or downlink communication and the sidelink communication is performed based on priority information of the sidelink communication.

8. The device of claim 5, wherein, based on (i) the switching from the sidelink communication to the uplink or downlink communication and (ii) the sidelink communication having higher priority than the uplink or downlink communication, the switching time is located on a first portion within the first slot.

9. A processing device adapted to control a device, the processing device comprising:
at least one processor; and
at least one memory connected to the at least one processor and storing instructions that, based on being executed by the at least one processor, cause the device to perform operations comprising:
obtaining configuration information related to a first slot for uplink or downlink communication;
obtaining configuration information related to a second slot for sidelink communication; and
performing switching between the uplink or downlink communication and the sidelink communication at a switching time,
wherein, based on (i) the switching from the uplink or downlink communication to the sidelink communication and (ii) the sidelink communication having higher priority than the uplink or downlink communication, the switching time is located on a last portion within the first slot, and
wherein, based on (i) the switching from the sidelink communication to the uplink or downlink communication and (ii) the sidelink communication having lower priority than the uplink or downlink communication, the switching time is located on a last portion within the second slot.

10. The processing device of claim 9, wherein, based on (i) the switching from the uplink or downlink communication to the sidelink communication, and (ii) the sidelink communication having lower priority than the uplink or downlink communication, the switching time is located on a first portion within the second slot.

11. The processing device of claim 9, wherein the switching between the uplink or downlink communication and the sidelink communication is performed based on priority information of the sidelink communication.

12. The processing device of claim 9, wherein, based on (i) the switching from the sidelink communication to the uplink or downlink communication and (ii) the sidelink communication having higher priority than the uplink or downlink communication, the switching time is located on a first portion within the first slot.

* * * * *